United States Patent
Kuo

(10) Patent No.: US 8,031,738 B2
(45) Date of Patent: Oct. 4, 2011

(54) METHOD OF ENHANCING CONTINUOUS PACKET CONNECTIVITY IN A WIRELESS COMMUNICATIONS SYSTEM AND RELATED APPARATUS

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 262 days.

(21) Appl. No.: 11/987,332

(22) Filed: Nov. 29, 2007

(65) Prior Publication Data

US 2008/0130492 A1 Jun. 5, 2008

Related U.S. Application Data

(60) Provisional application No. 60/868,078, filed on Nov. 30, 2006.

(51) Int. Cl.
*H04L 12/40* (2006.01)
(52) U.S. Cl. ......... 370/439; 370/329; 370/437; 370/468
(58) Field of Classification Search .................. 370/335, 370/349, 410, 439, 329, 437, 468
See application file for complete search history.

(56) References Cited

U.S. PATENT DOCUMENTS

| | | | |
|---|---|---|---|
| 6,301,479 B1 * | 10/2001 | Roobol et al. | 455/436 |
| 6,618,589 B1 * | 9/2003 | Rune et al. | 455/435.1 |
| 6,961,570 B2 * | 11/2005 | Kuo et al. | 455/435.1 |
| 7,209,747 B2 * | 4/2007 | Chen | 455/450 |
| 7,272,396 B2 * | 9/2007 | Obuchi et al. | 455/436 |
| 7,406,314 B2 * | 7/2008 | Sharma | 455/445 |
| 2006/0223537 A1 | 10/2006 | Kojima | |
| 2007/0133479 A1 * | 6/2007 | Montojo et al. | 370/335 |
| 2007/0177569 A1 * | 8/2007 | Lundby | 370/349 |
| 2008/0293426 A1 * | 11/2008 | Kim et al. | 455/450 |

FOREIGN PATENT DOCUMENTS

| | | |
|---|---|---|
| EP | 1519606 A1 * | 3/2005 |
| EP | 1928131 A2 | 6/2008 |
| KR | 1020060014928 | 2/2006 |
| KR | 100626968 | 9/2006 |
| KR | 1020080049643 | 6/2008 |

OTHER PUBLICATIONS

3GPP TSG-RAN-WG2 Meeting # 56 (Nov. 6-10, 2006), Change Request R2-063675 "Introduction of CPC" by Nokia, Qualcomm Europe, Ericsson, Siemens, Nortel, Vodafone, T-Mobile, pp. 1-8.

(Continued)

*Primary Examiner* — Ricky Ngo
*Assistant Examiner* — Dewanda Samuel
(74) *Attorney, Agent, or Firm* — Klein, O'Neill & Singh, LLP

(57) ABSTRACT

In order to avoid system malfunction, the present invention provides a method of enhancing continuous packet connectivity, known as CPC, for a user equipment, known as UE, in a wireless communications system. The method includes the following steps. A control channel less operation function is activated according to a status variable. The status variable is re-determined when a radio link failure occurs, when a radio link control, known as RLC, unrecoverable error occurs or when transmission of UE CAPABILITY INFORMATION fails, so as to deactivate the control channel less operation function. Preferably, the status variable is CPC_HS_SCCH_LESS_STATUS variable, and the control channel less operation function is HS-SCCH less operation, where HS-SCCH is an abbreviation of "Shared Control Channel for HS-DSCH".

8 Claims, 3 Drawing Sheets

OTHER PUBLICATIONS

3GPP TS 25.331 V7.2.0 (Sep. 2006) Radio Resource Control (RRC); Protocol Specification (Release 7), pp. 1-1306.

3GPP TSG-RAN WG2 Meeting #56 (Nov. 6-10, 2006) Change Request R2-063567 "Introduction of DTX-DRX and HS-SCCH less in RRC" by Qualcomm Europe, Nokia, Ericsson, Philips, pp. 1-114.

3GPP TSG-RAN WG2 Meeting #56 Tdoc R2-063309, Title: Introduction of DTX-DRX and HS-SCCH less in RRC, Nov. 6-10, 2006, Riga, Latvia.

3GPP TR 25.903 V1.2.0, Title: 3rd Generation Partnership Project; Technical Specification Group Radio Access Network; Continuous Connectivity for Packet Data Users; (Release 7), Nov. 2006.

Nokia et al., Title: Introduction of CPC, Nov. 6, 2006, pp. 1-7, 3GPP TSG-RAN-WG2 Meeting #56 R2-063592.

Qualcomm Europe: "TP on Reduced Complexity HS-SCCH-less Operation", 3GPP TSG-RAN WG1 #46, R1-062421, Aug. 28-Sep. 1, 2006, pp. 1-10, XP002594620, Tallinn, Estonia.

* cited by examiner

METHOD OF ENHANCING CONTINUOUS PACKET CONNECTIVITY IN A WIRELESS COMMUNICATIONS SYSTEM AND RELATED APPARATUS

CROSS REFERENCE TO RELATED APPLICATIONS

This application claims the benefit of U.S. Provisional Application No. 60/868,078, filed on Nov. 30, 2006 and entitled "Method And Apparatus for Enhancing CPC related procedures in a Wireless Communications System", the contents of which are incorporated herein by reference.

BACKGROUND OF THE INVENTION

1. Field of the Invention

The present invention relates to a method and related communications device for managing operation of control channels, and more particularly, to a method and related communications device for managing operation of control channels used in Continuous Packet Connectivity (CPC) for a user end in a wireless communications system.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting at the third generation mobile telecommunication technology, the prior art provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate. For HSDPA and HSUPA, the 3rd Generation Partnership Project (3GPP) provides a Continuous Packet Connectivity (CPC) protocol specification, which includes features that, for user equipments (UEs) in CELL_DCH state, aim to significantly increase the number of packet data users for a cell, reduce the uplink noise rise and improve the achievable download capacity for VoIP.

For an HSDPA UE, physical channels include a high speed physical downlink shared channel (HS-PDSCH), for transferring payload data, and a high speed physical control channel (HS-DPCCH) for uploading an acknowledgement/negative acknowledgement (ACK/NACK) and a channel quality identifier (CQI). As for the media access control (MAC) layer of the HSDPA UE, a MAC-hs entity utilizes a transport channel of High Speed Downlink Shared Channel (HS-DSCH) for receiving data from the physical layer. In addition, a shared control channel for HS-DSCH (HS-SCCH) is used as a physical downlink channel, responsible for transmission of control signals corresponding to HS-DSCH, such as demodulation information.

For an HSUPA UE, physical channels includes two uplink transport channels: an E-DCH dedicated physical data channel (E-DPDCH), for transferring payload data, and an E-DCH dedicated physical control channel (E-DPCCH) for transmission of control signals, such as retransmission numbers. Furthermore, a bundle of downlink physical channels are employed in the HSUPA system and used for transmitting control signals associated with grants, ACKs and etc. The downlink physical channels include E-DCH relative grant channel (E-RGCH), E-DCH absolute grant channel (E-AGCH), E-DCH HARQ acknowledgement indicator channel (E-HICH) and fractional dedicated physical channel (F-DPCH). As for the MAC layer of the HSUPA UE, a MAC-e/es entity utilizes a transport channel of Enhanced Dedicated Transport Channel (E-DCH) for transmitting MAC packet data to the physical layer with supporting a transmission time interval (TTI) of 10 milliseconds (ms) or 2 ms.

CPC includes an HS-SCCH less operation, which is a special mode of HSDPA operation for reducing HS-SCCH overhead for a hybrid automatic repeat request (HARQ) process, thereby reducing UE power consumption. Under this mode, the first HS-DSCH transmission of the HARQ process corresponding to small transport blocks (TBs) on pre-defined HS-DSCH is performed without accompaniment of HS-SCCH signaling, and the HARQ retransmissions corresponding to the first HS-DSCH transmission are accompanied with the HS-SCCH signaling if the retransmissions are needed. Accordingly, the UE needs blind decoding for TB data of the first transmission based on predefined TB size and channel coding set. If blind decoding is success, the UE reports ACK to the base station, also known Node-B, through HS-SCCH; otherwise, the UE reports nothing and waits for retransmission initiated by the Node-B. In order to combine the first transmission with the subsequent retransmissions, the HS-SCCH transmits required control signals of physical channel coding set, TB size, UE identity, a pointer and etc., where the pointer notify the UE of the TTI where the previous transmission has been performed. In addition, The UE can report ACK or NACK for the retransmission, and the retransmission is restricted to two times. The first and second retransmissions can be asynchronous with respect to the first transmission, and with respect to each other. The accompanying HS-SCCH follows the same timing relationship with the HS-PDSCH transmission as legacy transmissions do.

As to radio resource control (RRC), the UE and the network, such as the Node-B or a radio network controller (RNC), can configure the CPC by exchanging RRC messages and information elements (IEs) that include corresponding parameters. According to the RRC protocol specification of 3GPP, a Continuous Packet Connectivity HS-SCCH Less Information IE is provided to carry the configuration of "HS-PDSCH Code Index", "Transport Block Size Index" and etc. In general, the above IE can be included in RRC CONNECTION SETUP, ACTIVE SET UPDATE, CELL UPDATE CONFIRM or other reconfiguration messages, and can be transmitted to the UE through RRC procedures. On the other hand, the UE stores the configuration includes in the reconfiguration messages into a CPC_HS_SCCH_LESS_PARAMS variable.

Furthermore, the UE includes a CPC_HS_SCCH_LESS_STATUS variable having two possible values of "TRUE" and "FALSE, which represent the in-use state and the out-of-use state of the HS-SCCH less operation, respectively. According to the RRC specification, the UE is required to determine the value for CPC_HS_SCCH_LESS_STATUS variable if receiving any reconfiguration messages. Within the CPC_HS_SCCH_LESS_STATUS determination, the CPC_HS_SCCH_LESS_STATUS variable shall be set to "TRUE" when all of the following conditions are met:

1. the UE is in CELL_DCH state;
2. an HS_DSCH RECEPTION variable is set to "TRUE";
3. no DCH transport channel is configured;
4. the CPC_HS_SCCH_LESS_PARAMS is set;
5. the UE has received a Continuous Packet Connectivity HS-SCCH Less information IE from the latest reconfiguration message.

If any of the above conditions is not met and the CPC_HS_SCCH_LESS_STATUS variable is set to be "TRUE", the UE shall:
1. set the CPC_HS_SCCH_LESS_STATUS variable to be "FALSE";
2. clear the CPC_HS_SCCH_LESS_PARAMS variable;
3. stop all related activities of CPC HS-SCCH less operation.

Whenever the CPC_HS_SCCH_LESS_STATUS variable is set to "TRUE", the UE shall configure the physical and MAC layers to operate according to the CPC_HS_SCCH_LESS_PARAMS.

According to the above, the UE determines the value for CPC_HS_SCCH_LESS_STATUS variable only when receiving reconfiguration messages, and the HS-SCCH less operation is only applied to the UE in CELL_DCH. If a radio link failure or a radio link control (RLC) unrecoverable error occurs or if transmission of a UE CAPABILITY INFORMATION message fails during HS-SCCH less operation, the UE shall perform a cell update procedure to remedy those situations. When initiating the cell update procedure, the UE shall move to CELL_FACH state and select a suitable UMTS radio access (UTRA) cell for submitting a CELL UPDATE message. However, the prior art specification specifies no related actions of HS-SCCH less operation under the abovementioned situations. As a result, the UE of the prior art does not re-determine the CPC_HS_SCCH_LESS_STATUS variable when moving out of CELL_DCH state. That is, the UE continues applying HS-SCCH less operation in CELL_FACH state, which is not applicable for HS-SCCH less operation. This may cause severe errors in the physical and MAC layers of the UE.

The radio link failure may occur when the UE is situated in poor signal distributing area, such as a basement or rural area with small coverage. The RLC unrecoverable error is likely to occur due to many causes, such as RLC reset errors or RLC recovery errors. The UE CAPABILITY INFORMATION message is utilized to notify the UTRAN of information of specific UE capability (ex. radio access capability).

SUMMARY OF THE INVENTION

The present invention provides a method and related communications device for managing a less operation mode of a control channel of CPC for a user end in a wireless communications system to avoid system malfunction.

The present invention discloses a method of enhancing CPC for a UE in a wireless communications system. The method includes activating a control channel less operation according to a status variable, and re-determining the status variable and performing corresponding actions when a cell update procedure is initiated. The control channel less operation is used for a control channel corresponding to an HARQ process, in which no control signals corresponding to the first transmission of the HARQ process are transmitted on the control channel. Preferably, the control channel less operation is HS-SCCH less operation and the status variable is CPC_HS_SCCH_LESS_STATUS variable.

The present invention further discloses a communications device of a wireless communications system for CPC enhancement to prevent system malfunction. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes activating a control channel less operation according to a status variable, and re-determining the status variable and performing corresponding actions when a cell update procedure is initiated. The control channel less operation is used for a control channel corresponding to an HARQ process, in which no control signals corresponding to the first transmission of the HARQ process are transmitted on the control channel. Preferably, the control channel less operation is HS-SCCH less operation and the status variable is CPC_HS_SCCH_LESS_STATUS variable.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
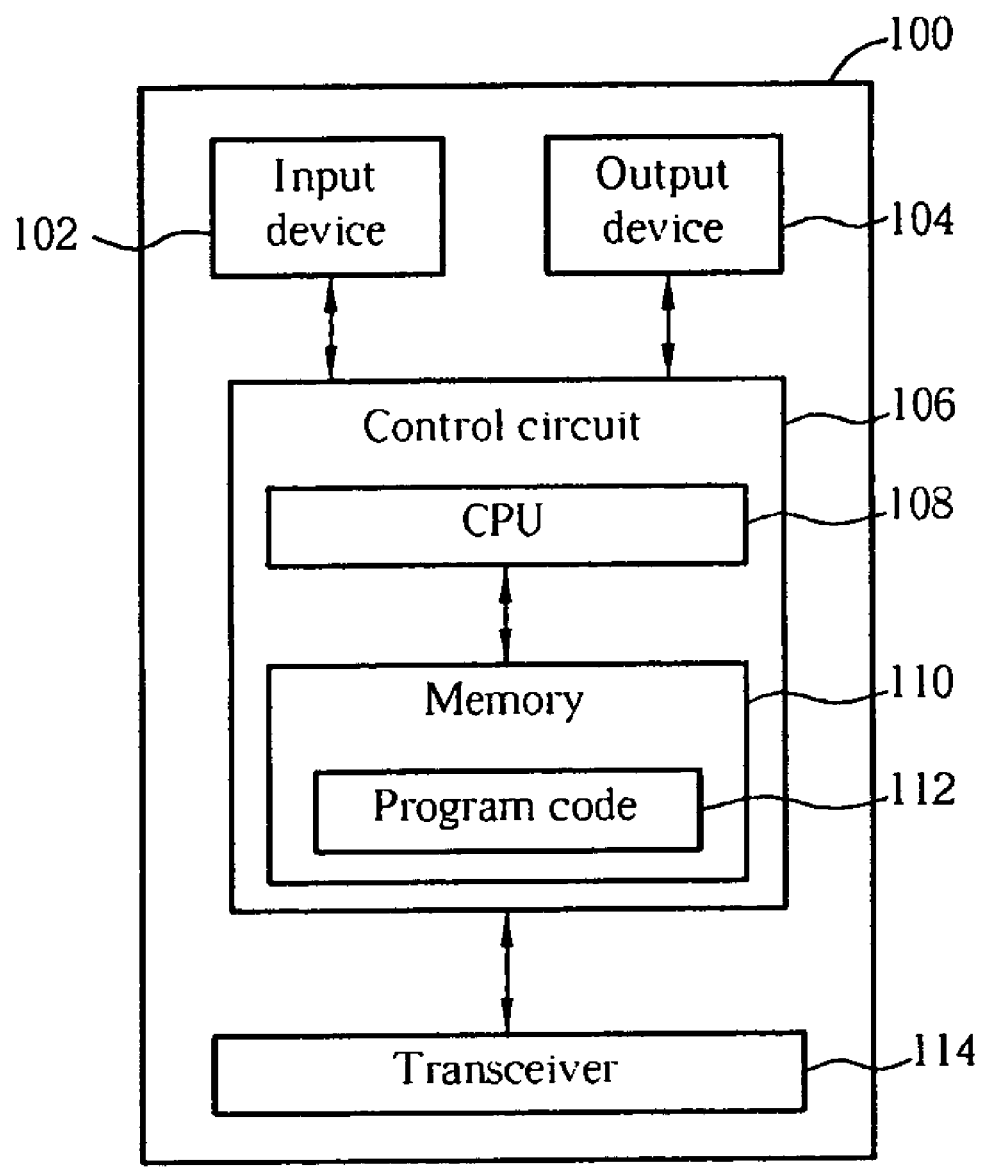
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a High Speed Package Access (HSPA) system of the third generation (3G) mobile communications system, supporting Continuous Packet Connectivity (CPC).

Figure 2:
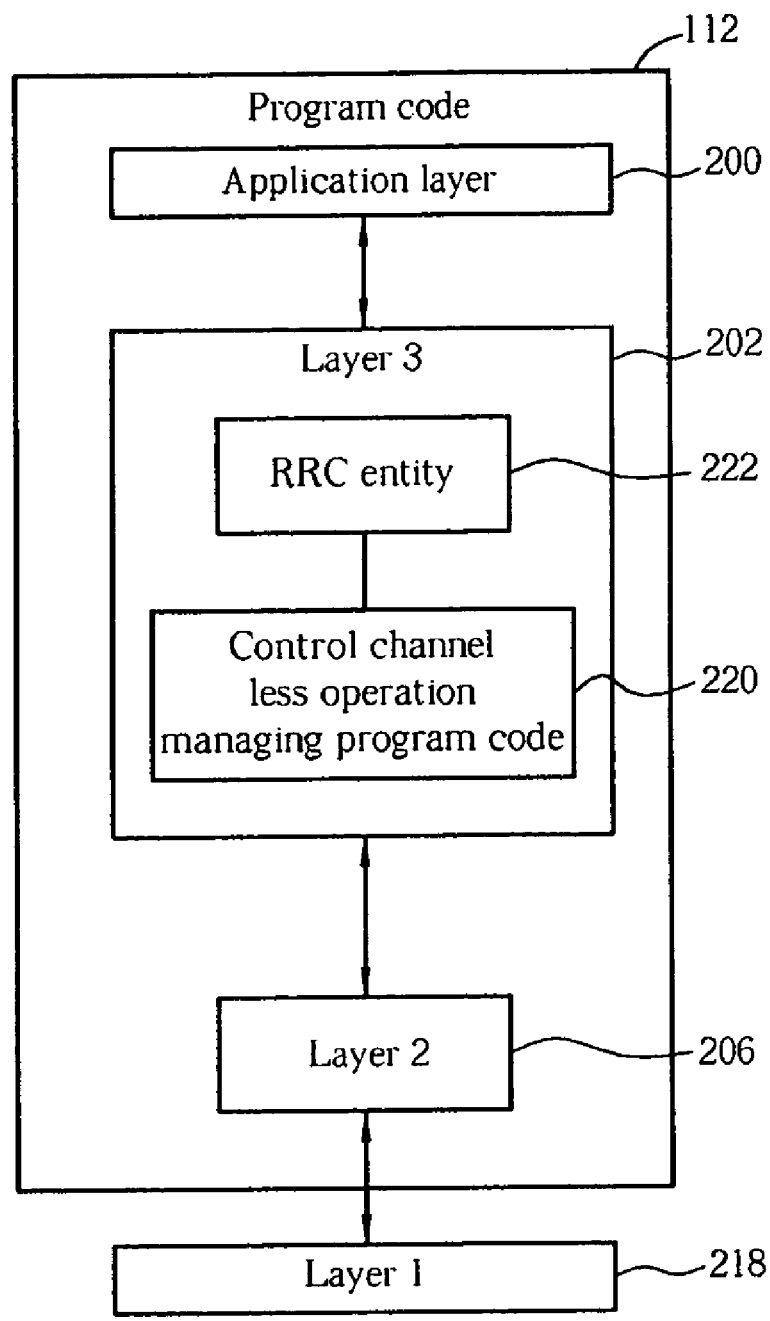
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a radio resource control (RRC) entity 222, which is used for controlling the Layer 1 218 and the Layer 2 206 and performing peer-to-peer RRC communication with other communications devices, such as a Node-B or a UTAN. In addition, the RRC entity 222 can change an RRC state of the communications device 100, switching between an Idle mode, CELL_PCH, URA_PCH, CELL_FACH or CELL_DCH state.

The Layer 2 206 includes a radio control link (RLC) layer and a media access control (MAC) layer, and the Layer 1 218 is physical layer. When the HSDPA is in use, the MAC layer listens to HS-SCCH for HS-DSCH signaling reception and thereby receives packet data by listening to HS-DSCH. Besides, HS-PDSCH and HS-DPCCH are used for exchanging payload data between the communications device 100 and the network.

The network communications device can form RRC messages and information elements (IEs) to transmit CPC configuration to the communications device 100 via radio bearers. The reconfiguration messages, such as RRC CONNECTION SETUP, ACTIVE SET UPDATE or CELL UPDATE CONFIRM message, are allowed to include parameters of HS-SCCH less operation of CPC. Accordingly, the communications device 100 stores received parameters into a CPC_HS_SCCH_LESS_PARAMS variable and thereby changes operation of the Layer 2 206 and the Layer 1 218. Furthermore, the communications device 100 includes a CPC_HS_SCCH_LESS_STATUS variable having two possible values of "TRUE" and "FALSE", which represent an in-use state and an out-of-use state of the HS-SCCH less operation, respectively.

Figure 3:
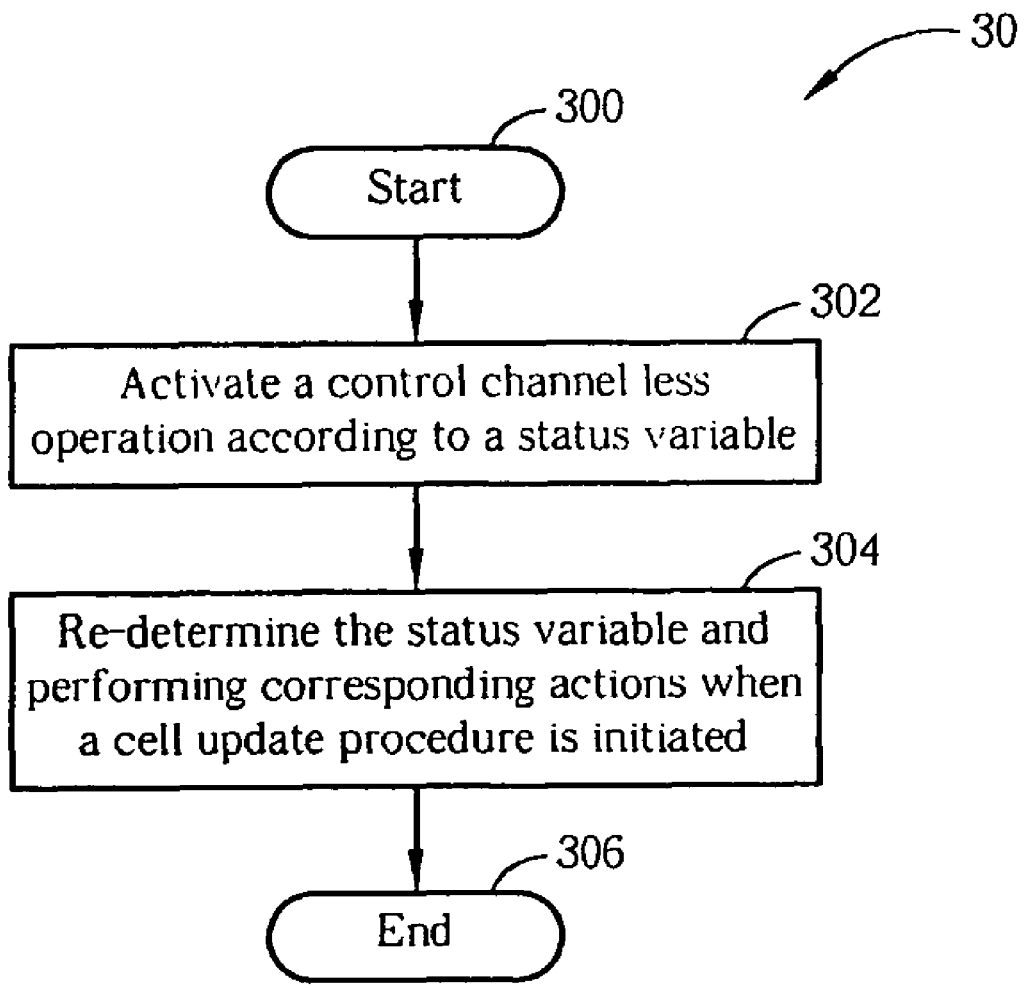
FIG. 3 is a flowchart diagram of a process according to an embodiment of the present invention.

In this situation, the embodiment of the present invention provides a control channel less operation managing program code 220 for the program code 112 to avoid system malfunction. Please refer to FIG. 3, which illustrates a schematic diagram of a process 30 according to an embodiment of the present invention. The process 30 is utilized for managing control channel less operation for a UE in a wireless communications system, and can be compiled into the control channel less operation managing program code 220. The process 30 includes the following steps:

| | |
|---|---|
| Step 300: | Start. |
| Step 302: | Activate a control channel less operation according to a status variable. |
| Step 304: | Re-determine the status variable and performing corresponding actions when a cell update procedure is initiated. |
| Step 306: | End. |

In the process 30, the control channel less operation is used for a control channel corresponding to an HARQ process, in which no control signals corresponding to the first transmission of the HARQ process are transmitted on the control channel.

Preferably, the status variable is CPC_HS_SCCH_LESS_STATUS variable, and the control channel less operation function is HS-SCCH less operation. According to the HS-SCCH less operation, the first HS-DSCH transmission of the HARQ process corresponding to small TBs is performed without accompaniment of HS-SCCH signaling, and the HARQ retransmissions corresponding to the first HS-DSCH transmission are accompanied with the HS-SCCH signaling if the retransmissions are needed.

When CPC_HS_SCCH_LESS_STATUS variable is set to "TRUE", the HS-SCCH less operation is activated. When a radio link failure or an RLC unrecoverable error occurs or when transmission of a UE CAPABILITY INFORMATION message fails during HS-SCCH less operation, the cell update procedure is initiated to remedy those situations. When the cell update procedure is initiated, the UE moves to CELL_FACH state for selection of a suitable UTRA cell, and moreover the CPC_HS_SCCH_LESS_STATUS variable is re-determined by determining whether all of the abovementioned conditions are met for setting the CPC_HS_SCCH_LESS_STATUS variable to be "TRUE". Since the UE no longer stays in CELL_DCH state, the conditions required setting the CPC_HS_SCCH_LESS_STATUS variable to be "TRUE" are not all met. The UE then performs corresponding actions, where the corresponding actions include:

1. set the CPC_HS_SCCH_LESS_STATUS variable to be "FALSE" if the CPC_HS_SCCH_LESS_STATUS variable is originally set to be "TRUE";
2. clear the CPC_HS_SCCH_LESS_PARAMS variable;
3. stop all related activities of CPC HS-SCCH less operation.

Through the above actions, HS-SCCH less operation is stopped when the cell update procedure is initiated.

In addition, an alternative of stopping HS-SCCH less operation is performing the abovementioned actions directly without re-determining the CPC_HS_SCCH_LESS_STATUS variable after a suitable UTRA cell is selected during the cell update procedure. Thus, when a radio link failure or an RLC unrecoverable error occurs or when transmission of a UE CAPABILITY INFORMATION message fails, the UE can timely stop HS-SCCH less operation of the physical and MAC layers to avoid system malfunction.

Please note that the embodiment of the present invention takes HS-SCCH for example, and the present invention is also applied to control channels taking similar less operation for the HARQ process for CPC.

In conclusion, the embodiment of the present invention specifies the UE to stop HS-SCCH less operation when a radio link failure or an RLC unrecoverable error occurs or when transmission of a UE CAPABILITY INFORMATION message fails.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of enhancing continuous packet connectivity, abbreviated to CPC, for a user equipment, called UE hereinafter, in a wireless communications system, the method comprising:
    activating a control channel less operation by a radio resource control, hereinafter called RRC, entity of the UE according to a status variable; and
    re-determining the status variable and stopping all related activities of the control channel less operation by the RRC entity when a cell update procedure is initiated;
    wherein the control channel less operation is used for a control channel corresponding to a hybrid automatic repeat request, known as HARQ, process, in which no control signals corresponding to the first transmission of the HARQ process are transmitted on the control channel.

2. The method of claim 1, wherein the control channel less operation is HS-SCCH less operation and the status variable is CPC_HS_SCCH_LESS_STATUS variable.

3. The method of claim 1, wherein the cell update procedure is initiated due to radio link failure, radio link control unrecoverable error or failed transmission of a UE CAPABILITY INFORMATION message.

4. The method of claim 1, wherein additional actions, performed when the cell update procedure is initiated, comprise:

setting the status variable to be "FALSE" if the status variable is originally set to be "TRUE";

clearing a parameter variable corresponding to the control channel less operation;

where the status variable is CPC_HS_SCCH_LESS_STATUS variable and the parameter variable is CPC_HS_SCCH_LESS_PARAMS variable if the control channel less operation is HS-SCCH less operation.

5. A communications device of a wireless communications system utilized for continuous packet connectivity, abbreviated to CPC, enhancement, the communications device comprising:

a control circuit for realizing functions of the communications device;

a central processing unit installed in the control circuit for executing a program code to operate the control circuit; and a memory coupled to the central processing unit for storing the program code;

wherein the program code comprises:

activating a control channel less operation according to a value of a status variable; and re-determining the status variable and stopping all related activities of the control channel less operation by the RRC entity when a cell update procedure is initiated;

wherein the control channel less operation is used for a control channel corresponding to a hybrid automatic repeat request, known as HARQ, process, in which no control signals corresponding to the first transmission of the HARQ process are transmitted on the control channel.

6. The communications device of claim 5, wherein the control channel less operation is HS-SCCH less operation and the status variable is CPC_HS_SCCH_LESS_STATUS variable.

7. The communications device of claim 5, wherein the cell update procedure is initiated due to radio link failure, radio link control unrecoverable error or failed transmission of a UE CAPABILITY INFORMATION message.

8. The communications device of claim 5, wherein additional actions, performed when the cell update procedure is initiated, comprise:

setting the status variable to be "FALSE" if the status variable is originally set to be "TRUE";

clearing a parameter variable corresponding to the control channel less operation;

where the status variable is CPC_HS_SCCH_LESS_STATUS variable and the parameter variable is CPC_HS_SCCH_LESS_PARAMS variable if the control channel less operation is HS-SCCH less operation.

* * * * *